March 8, 1938. L. EIRICH ET AL 2,110,504
EDGE RUNNER MIXING AND KNEADING MACHINE
Original Filed Sept. 21, 1931 2 Sheets-Sheet 1
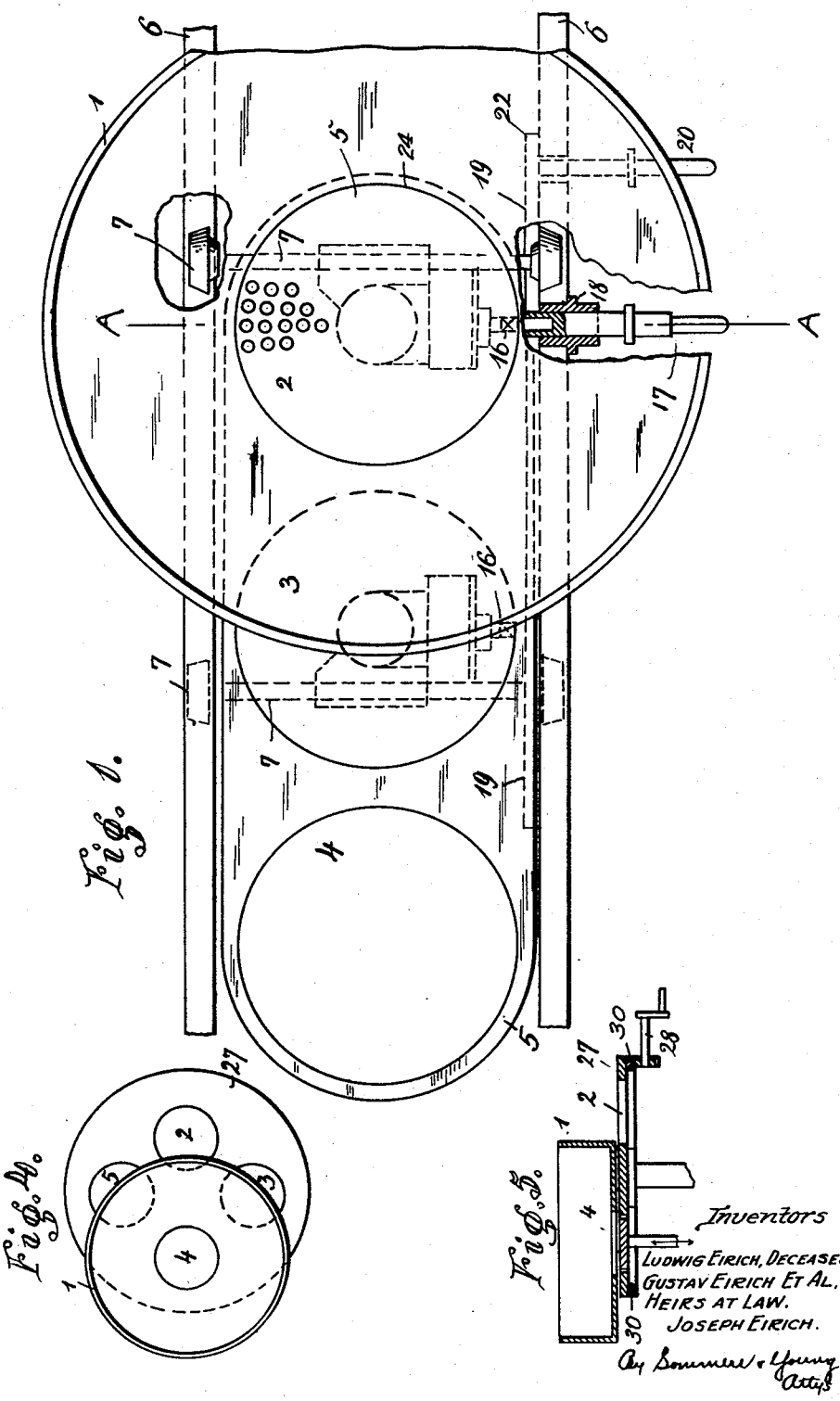
Inventors
LUDWIG EIRICH, DECEASED.
GUSTAV EIRICH ET AL,
HEIRS AT LAW.
JOSEPH EIRICH.

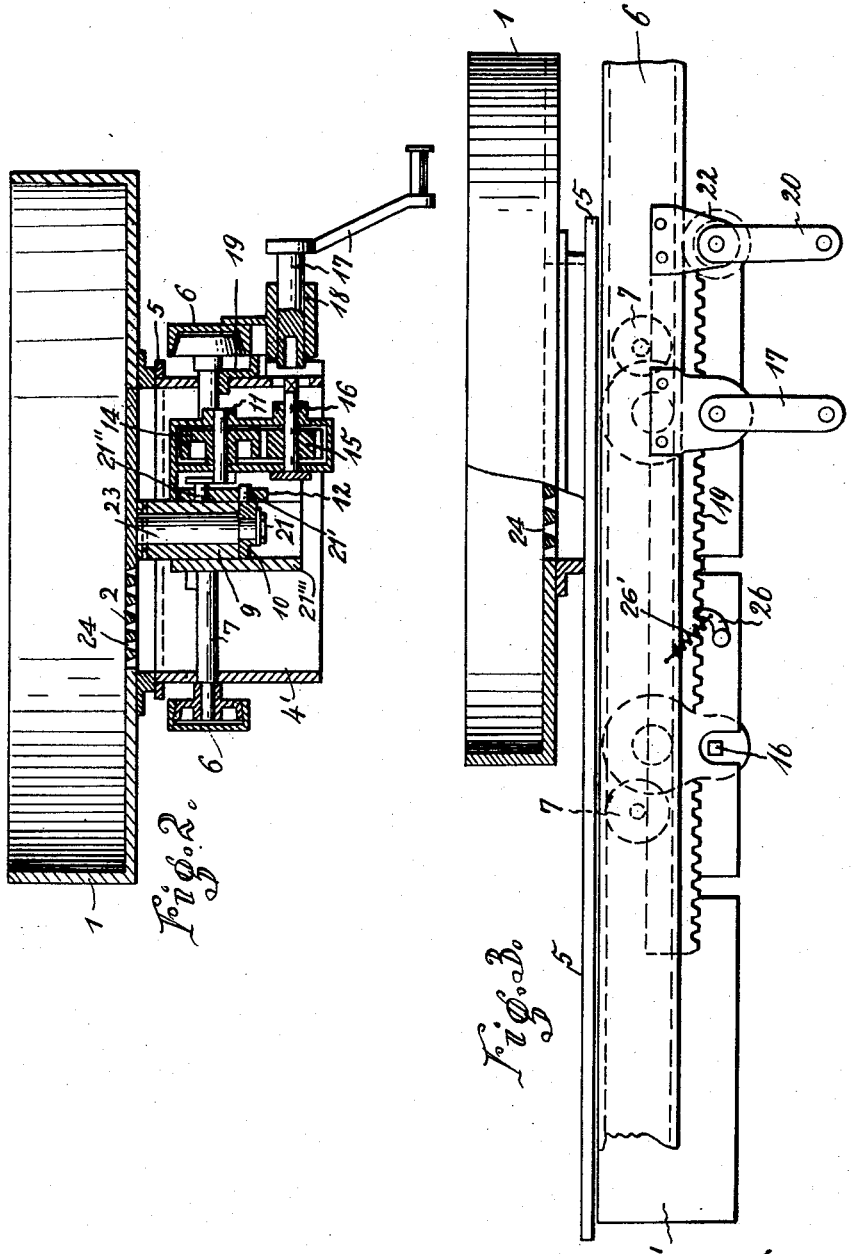

Patented Mar. 8, 1938

2,110,504

UNITED STATES PATENT OFFICE 2,110,504

EDGE RUNNER MIXING AND KNEADING MACHINE

Ludwig Eirich, deceased, late of Hardheim, Germany, by Gustav Eirich, Ludwig Eirich, Walburga Eirich, Maria Hollerbach, Rosa Eirich, Johanna Eirich, and Anna Eirich, Hardheim, Germany, heirs at law, and Joseph Eirich, Hardheim, Germany Original application September 21, 1931, Serial No. 564,208. Divided and this application August 7, 1935, Serial No. 35,194. In Germany September 27, 1930

5 Claims. (Cl. 83—45)

This invention relates to an edge runner mixing and kneading machine with a rotating mixing plate comprising in combination a rotary, partly solid, and partly perforated grinding plate having a discharge aperture, as described in the application of Eirich et al. Serial No. 564,208, filed September 21, 1931, now Patent No. 2,031,149, dated February 18, 1936, of which this application is a division.

It is desirable for such kneading and mixing machines to work continuously, that is, that material be continuously supplied to the same and the finished material continuously discharged therefrom. By this machine the mixing can be carried out not only continually but also in separate charges. For this purpose the sieve plates are interchangeably fixed in the bottom portion of the grinding plate.

In order to effect in a simple manner a more rapid interchanging of the insertion pieces, for instance the sieve plates, a plate may be arranged under the discharge which has several apertures of the size of the insert pieces to be interchanged. If this plate has two apertures, they are adapted to accommodate two insertable sieves with holes of different sizes, or one of the apertures may accommodate a solid plate and the other a sieve. If this plate has three apertures, the middle one may serve for holding a solid insertion piece, and the outer apertures each serve for holding a sieve, the holes of the two sieves being of different sizes. The insertion pieces are raised and inserted from below into the discharge opening of the rotating mixing plate, by means of a separate device.

More than three apertures may be provided in the holding plate. Instead of a reciprocating holding plate, a circular table plate with apertures for the insertion pieces may be arranged under the mixing plate so that, when the table is rotated, other insertion pieces with perforations of different sizes or a solid insert piece are brought successively underneath the discharge. By a lever device, eccentric, or shaft with a pinion, a sieve or solid plate may be raised or lowered as soon as it arrives underneath the discharge opening of the mixing plate or as soon as the corresponding aperture in the table arrives under this discharge so as to receive the sieve or solid plate.

In order for this machine to work with continual passing through of the material, or with intermittent passing through, i. e. with interposition of mixing and delivering periods of any desired duration, the arrangement, hereinafter described in detail, is connected with the sieve plate.

In the accompanying drawings:—

Figs. 1–5 illustrate the arrangement for interchanging the insertion pieces in the plate, Fig. 1 is a top plan view, Fig. 2 is a section on line A—A of Fig. 1, Fig. 3 is a side elevation of the machine shown in Fig. 1, Figs. 4 and 5 illustrate diagrammatically in plan and vertical section respectively the arrangement of the circular table plate with apertures.

The plate 5 with apertures, shown in Figs. 1–3, is moved by means of a hand crank 20 having a shaft and a pinion 22 keyed on the end of the shaft. This pinion 22 meshes with a rack 19 rigidly connected with the plate 5. The diameter and number of teeth of pinion 22 are selected so that, after every second revolution, the apertures 2, 3 or 4 of the plate 5 stand accurately under the discharge aperture 24 of the mixing plate 1. For securing the plate 5 in position, the hand crank 20 is made with a heavy mass which in this position hangs downward; or a spring-tensioned catch 26 is provided for engaging with a corresponding notch of rack 19 in order to lock the same. Catch 26 is resiliently drawn counterclockwise (Fig. 3) by coil spring 26' attached at its other end to the frame of the machine.

The movement of the insert pieces 2 and 3 in vertical direction is effected by turning the crank shaft 17 shiftable in the sleeve 18. By this shifting the square socket of shaft 17 comes into engagement with the square end of the pinion axle 16 and this connection is disengaged by withdrawing the crank shaft 17.

A pinion 15 is keyed on axle 16, the diameter of this pinion being half that of the toothed wheel 14 keyed on the crank shaft 11 having a cranking stud 21'' engaging connecting rod 12. The crank therefore actuates a connecting rod 12 which is connected with a stud 21' of the flange 10. The shaft 23 and the insertion piece 2 are consequently moved up or down and thereby the insertion pieces are inserted or withdrawn.

As the diameter of the pinion 15 is half that of the toothed wheel 14, the hand crank 17 must carry out a complete revolution to complete the vertical movement of the insertion piece 2. The insertion piece 2 can be secured in the extreme highest or lowest position either by means of a weight on the crank 17 or by the insertion of a locking pin. Reference numeral 6 designates the machine frame and 4' the tube on the discharge opening.

The arrangement is operated in the following manner: The insertion piece 2, 3 or 4, be it a sieve or a solid plate, is moved under the discharge opening of the mixing plate by rotation of the hand crank 20. By pushing the axle 17 upon the square portion of shaft 16 and rotating the hand crank, the insert piece 2, 3 or 4 is pushed from below into the discharge aperture until its upper edge is flush with the bottom surface of the plate. The mixing can now begin.

If these simple movements are carried out in inverse succession the insert piece moves out of the discharge opening of the machine.

By suitably selecting the length of the rack 19, it is possible to push the plate 5 with apertures so far beyond the rotating mixing plate, that the insertion pieces can be easily removed and interchanged.

The connection of the shaft 23 on the insertion piece with the bearing bush can be disconnected by loosening the nut 21, so that the insertion piece with the shaft 23 can be removed. Another insertion piece can be inserted and then secured in its position by tightening the nut 21.

The plate 5 wth the accessories is fixed on several axles 7 by means of four or more supporting rollers running on the machine frame 6.

The desired solidity is imparted to the arrangement by sleeve 9, slidably mounted in sleeve 21''', and shaft 23 for the sieves 2 so that even the heaviest edge running work can be carried out with this machine, without the insertion piece yielding or bending.

The hand cranks 17 and 20 may be controlled automatically at certain intervals, instead of being controlled by hand.

Figs. 4 and 5 show diagrammatically the arrangement of a circular table 27 with apertures 2, 3, 4 and 5 for the insertion pieces under the mixing plate 1. This table has a toothed rim 30 adapted to be rotated by crank and pinion 28. The device for raising and lowering the insertion pieces is the same as above described with reference to the reciprocating table plate.

What is claimed is:

1. An edge runner mixing and kneading machine comprising a rotating mixing and grinding plate provided with an opening, a plurality of insert members disposed slidably below said opening of the mixing plate, a rack disposed under the grinding plate for moving the insert members horizontally, means for moving each insert member vertically, means for guiding each insert member, means for easily releasing the insert members from the guide means, and means for accurately setting the rack in position where the insert members register vertically with the opening of the grinding plate.

2. An edge runner mixing and kneading machine comprising a rotating mixing and grinding plate provided with an opening, a plurality of insert members slidably disposed below said opening, a rack disposed below the grinding plate, a gear engaging said rack, a crank for actuating said gear, said rack being connected with said insert members to move them horizontally selectively into register with the opening of the grinding plate, raising and lowering mechanism for each insert member comprising a shaft depending from the insert member, a sleeve surrounding said shaft, a detachable flange on the lower end of the shaft contacting the lower end of the sleeve and having a pin extending outwardly therefrom, a second crank, said second crank having a connecting rod, said pin being connected with said connecting rod, and gears for actuating said connecting rod, a carriage frame, supports on which said frame runs, said carriage frame carrying the insert members, the rack and the mechanism for raising and lowering the insert members.

3. An edge runner mixing and kneading machine having a rotating plate provided with an opening, a second plate slidably disposed below said rotating plate and provided with a plurality of openings, an insert member mounted in each opening of said second plate, a carriage frame carrying said second plate, and a raising and lowering device for each insert member carried on said carriage frame.

4. An edge runner mixing and kneading machine having a rotating plate provided with a discharge opening, a second plate provided with a plurality of openings slidably disposed below the discharge opening of the rotating plate, insert members in the openings of said second plate, a frame carrying said second plate, means carried by said frame for raising and lowering each of said insert members and a tube at the discharge opening for preventing spurting of material discharging through said discharge opening.

5. An edge runner mixing and kneading machine having a rotating plate provided with a discharge opening, a rotatable table below the discharge opening, said table having a plurality of openings provided with insert members, a crank having a connecting rod, for actuating said insert members and a crank and gear for rotating said table to position the inserts in vertical alignment with the discharge opening of the rotating plate.

GUSTAV EIRICH,
LUDWIG EIRICH,
WALBURGA EIRICH,
MARIA HOLLERBACH,
ROSA EIRICH,
JOHANNA EIRICH,
ANNA EIRICH,
*Heirs at Law of Ludwig Eirich, Deceased.*
JOSEPH EIRICH.